United States Patent
Chase et al.

(10) Patent No.: US 8,108,157 B2
(45) Date of Patent: Jan. 31, 2012

(54) ELECTROSPUN FIBROUS NANOCOMPOSITES AS PERMEABLE, FLEXIBLE STRAIN SENSORS

(75) Inventors: George G. Chase, Wadsworth, OH (US); Alexander Yarin, Willowbrook, IL (US); Manish K. Tiwari, Zurich (CH); Constantine M. Megaridis, Oak Park, IL (US)

(73) Assignee: The University of Akron, Akron, OH (US)

( * ) Notice: Subject to any disclaimer, the term of this patent is extended or adjusted under 35 U.S.C. 154(b) by 488 days.

(21) Appl. No.: 12/378,667

(22) Filed: Feb. 18, 2009

(65) Prior Publication Data

US 2009/0254288 A1    Oct. 8, 2009

Related U.S. Application Data

(60) Provisional application No. 61/029,453, filed on Feb. 18, 2008.

(51) Int. Cl.
*G06F 19/00* (2011.01)
(52) U.S. Cl. ......................................................... 702/42
(58) Field of Classification Search ................... 702/42, 702/182–185; 73/777
See application file for complete search history.

(56) References Cited

U.S. PATENT DOCUMENTS

| | | | |
|---|---|---|---|
| 6,074,550 A | 6/2000 | Hofmann et al. | |
| 6,413,290 B1 | 7/2002 | Gruber | |
| 7,434,475 B2 * | 10/2008 | Mainwaring et al. | 73/777 |
| 2003/0234225 A1 | 12/2003 | Brunsell | |

FOREIGN PATENT DOCUMENTS

| | | |
|---|---|---|
| EP | 0891952 A1 | 1/1999 |
| GB | 2362469 A | 5/2000 |
| JP | 2001276509 | 10/2001 |
| JP | 2006200924 | 8/2006 |
| JP | 2006200926 | 8/2006 |

OTHER PUBLICATIONS

Hutchinson, C.W., "On-line Particle Counting for Filtration Control", ISA Transactions (1985), 24(3), 75-82.
Hwang, Jeesang, "Electrical and Mechanical properties of Carbon-Black-Filled, Electrospun Nanocomposite Fiber Webs", Journal of Applied Polymer Science, vol. 104, 2410-2417, Sep. 2006.

* cited by examiner

*Primary Examiner* — Edward Raymond
(74) *Attorney, Agent, or Firm* — Renner, Kenner, Greive, Bobak, Taylor & Weber

(57) ABSTRACT

The present invention generally relates to methods to provide electrospun polymer/nanoparticle composite-fiber structures for use as lightweight, compliant, porous strain sensors for non-cyclic strain sensing. In one embodiment, the fibers in the nanocomposites comprise, for example, poly($\in$-caprolactone) (PCL) dielectric polymer matrix with embedded electrically conductive carbon black (CB) nanoparticles. In another embodiment, the composite-fiber structures of the present invention contain at least about 7 weight percent or more of CB and are electrically conducting in the as-spun, un-deformed state, and are thus called conductive polymer composites (CPC). In still another embodiment, the electrical resistance of a nanocomposite structure according to the invention increases with strain, and at sufficiently high strains the structure is rendered non-conductive.

27 Claims, 10 Drawing Sheets

ELECTROSPUN FIBROUS NANOCOMPOSITES AS PERMEABLE, FLEXIBLE STRAIN SENSORS

RELATED APPLICATION DATA

This patent application claims priority to previously filed U.S. Provisional Patent Application 61/029,453, filed on Feb. 18, 2008, entitled "Electrospun Fibrous Nanocomposite as Permeable, Flexible Strain Sensors," the entirety of which is hereby incorporated herein by reference.

This material is based upon work supported in part by the National Science Foundation under Grant No. NIRT CBET-0609062. The United States government may have certain rights to the invention or inventions herein.

FIELD OF THE INVENTION

The present invention generally relates to methods to provide electrospun polymer/nanoparticle composite-fiber structures for use as lightweight, compliant, porous strain sensors for non-cyclic strain sensing. In one embodiment, the fibers in the nanocomposites comprise, for example, poly($\epsilon$-caprolactone) (PCL) dielectric polymer matrix with embedded electrically conductive carbon black (CB) nanoparticles. In another embodiment, the composite-fiber structures of the present invention contain at least about 7 weight percent or more of CB and are electrically conducting in the as-spun, un-deformed state, and are thus called conductive polymer composites (CPC). In still another embodiment, the electrical resistance of a nanocomposite structure according to the invention increases with strain, and at sufficiently high strains the structure is rendered non-conductive.

BACKGROUND OF THE INVENTION

Lightweight, compliant or flexible and permeable sensors are attractive due to the increasingly important challenge of integrating such sensors into complex systems and structures. Developing intelligent and communicative textile structures, smart analyte vapor sensors for defense and security applications, environmental and medical diagnostics, self-reporting smart structures and, in particular, self-reporting filter media are among many important potential applications of such sensors. Polymeric materials are attractive for such compliant sensors due to their light weight and inherent flexibility. However, most easily processable polymers are electric insulators, so characterization based on generation of a measurable electric signal in response to an external stimulus becomes a problem.

Two different approaches have been adopted to address this problem. The first one involves intrinsically conductive polymers and their blends. This approach, however, has certain limitations. Most conducting polymers cannot be melt-processed and are insoluble in common organic solvents. As a result, advanced solution processing steps are needed to improve their low solubility, making their processing difficult.

A second approach uses conductive polymer composites (CPCs), which involve an insulating polymer matrix and a conductive percolating network of a filler e.g. metal (like copper, aluminum, gold and silver, etc.) or CB nanoparticles, carbon fibers or nanotubes, conductive polymers, or their combinations. Among the conductive fillers, metals have the highest conductivity. However, they also have the highest cost and are amenable to spontaneous oxidation (e.g., copper and aluminum) when brought in contact with atmospheric oxygen. The technology for the stable and controlled synthesis of defect-free carbon nanotubes and nanofibers is still in a developmental stage; however, the high aspect ratio of nanotubes/nanofibers can be very beneficial for improved percolative properties. Carbon black nanoparticles, on the other hand, are very stable, possess a sufficiently high electrical conductivity and are relatively inexpensive. The primary advantage of CPC is in their simplicity and low cost. CB-based CPCs have been proposed in a number of sensor applications. The common examples include, but are not limited to, chemical vapor sensors for different analyte(s)—the so-called "electronic nose" sensors—and mechanical strain sensors. However, these applications do not address porous, flexible strain sensors, such as those set forth herein. It has remained to be determined, however, what constitutes an optimum concentration of the filler particles in the matrix for highest possible performance.

SUMMARY OF THE INVENTION

The present invention generally relates to methods to provide electrospun polymer/nanoparticle composite-fiber structures for use as lightweight, compliant, porous strain sensors for non-cyclic strain sensing. In one embodiment, the fibers in the nanocomposites comprise, for example, poly($\epsilon$-caprolactone) (PCL) dielectric polymer matrix with embedded electrically conductive carbon black (CB) nanoparticles. In another embodiment, the composite-fiber structures of the present invention contain at least about 7 weight percent or more of CB and are electrically conducting in the as-spun, un-deformed state, and are thus called conductive polymer composites (CPC). In still another embodiment, the electrical resistance of a nanocomposite structure according to the invention increases with strain, and at sufficiently high strains the structure is rendered non-conductive. In one instance, the reduction in conductivity may be attributed to diminishing contacts between carbon black (CB) particles in strained fibers. A reproducible correlation between electrical resistance of the nanocomposite structures and their stretching suggests that they can be used as resistive non-cyclic strain sensors, and can be useful, for example, when embedded in filters, to indicate filter overstretching due to clogging. In addition, a formula is provided to relate permeability of a clogged filter to the strain of an embedded sensor, and in turn to the electrical resistance of the sensor.

In one embodiment, the present invention relates to a strain sensor comprising: (a) at least one conductive electrospun fiber portion containing therein or thereon at least one conductive compound, wherein the at least one conductive electrospun fiber portion is mounted on a substrate, or freely suspended, via at least two contact points; (b) at least one electric current and/or voltage sensing device that is designed to provide an electric current and/or voltage to the at least one conductive electrospun fiber portion via at least two appropriately spaced contact points; and (c) at least one electric current and/or voltage calculation and/or observation means, wherein the electric current and/or voltage sensing device is designed to monitor the electric current and/or voltage through the at least one conductive electrospun portion, and in conjunction with the at least one electric current and/or voltage calculation and/or observation means permits one to monitor the strain that exists in the at least one conductive electrospun fiber portion of the strain sensor.

In another embodiment, the present invention relates to a strain-sensor comprising: (i) a first conductive fiber layer, the first conductive fiber layer having a top surface and a bottom surface; (ii) a filter layer, the filter layer having a top surface and a bottom surface where the top surface of the filter layer is in contact with the bottom surface of the first conductive layer; (iii) a second conductive fiber layer, the second conductive fiber layer having a top surface and a bottom surface where the top surface of the second conductive fiber layer is in contact with the bottom surface of the filter layer; (iv) at least one electric current and/or voltage sensing device that is designed to provide an electric current and/or voltage to the combination of the first conductive fiber layer, the filter layer, and the second conductive fiber layer via at least two appropriately spaced contact points; and (v) at least one electric current and/or voltage calculation and/or observation means, wherein the electric current and/or voltage sensing device is designed to monitor the electric current and/or voltage through the combination of the first conductive fiber layer, the filter layer, and the second conductive fiber layer, and in conjunction with the at least one calculation means permits one to monitor the strain that exists in the strain sensor.

In still another embodiment, the present invention relates to a method for determining variations in localized flow rates, pressure gradients, and/or particle loading in a filter medium, the method comprising the steps of: (I) supplying at least one filter medium having located therein at least one strain sensor, the at least one strain sensor comprising: (a) at least one conductive electrospun fiber portion containing therein or thereon at least one conductive compound, wherein the at least one conductive electrospun fiber portion is mounted on a substrate, or freely suspended, via at least two contact points; (b) at least one electric current and/or voltage sensing device that is designed to provide an electric current and/or voltage to the at least one conductive electrospun fiber portion via at least two appropriately spaced contact points; and (c) at least one electric current and/or voltage calculation and/or observation means; (II) supplying at least one electric current and/or voltage sensing device that is designed to monitor the electric current and/or voltage through the at least one conductive electrospun portion of the at least one strain sensor; (III) supplying at least one electric current and/or voltage calculation and/or observation means designed to monitor any change in the electric current and/or voltage through the at least one conductive electrospun portion of the at least one strain sensor; and (IV) using any such change in the electric current and/or voltage through the at least one conductive electrospun portion of the at least one strain sensor to determine one or more variations in localized flow rates, pressure gradients, and/or particle loading in a filter medium.

DETAILED DESCRIPTION OF THE INVENTION

Figure 1:
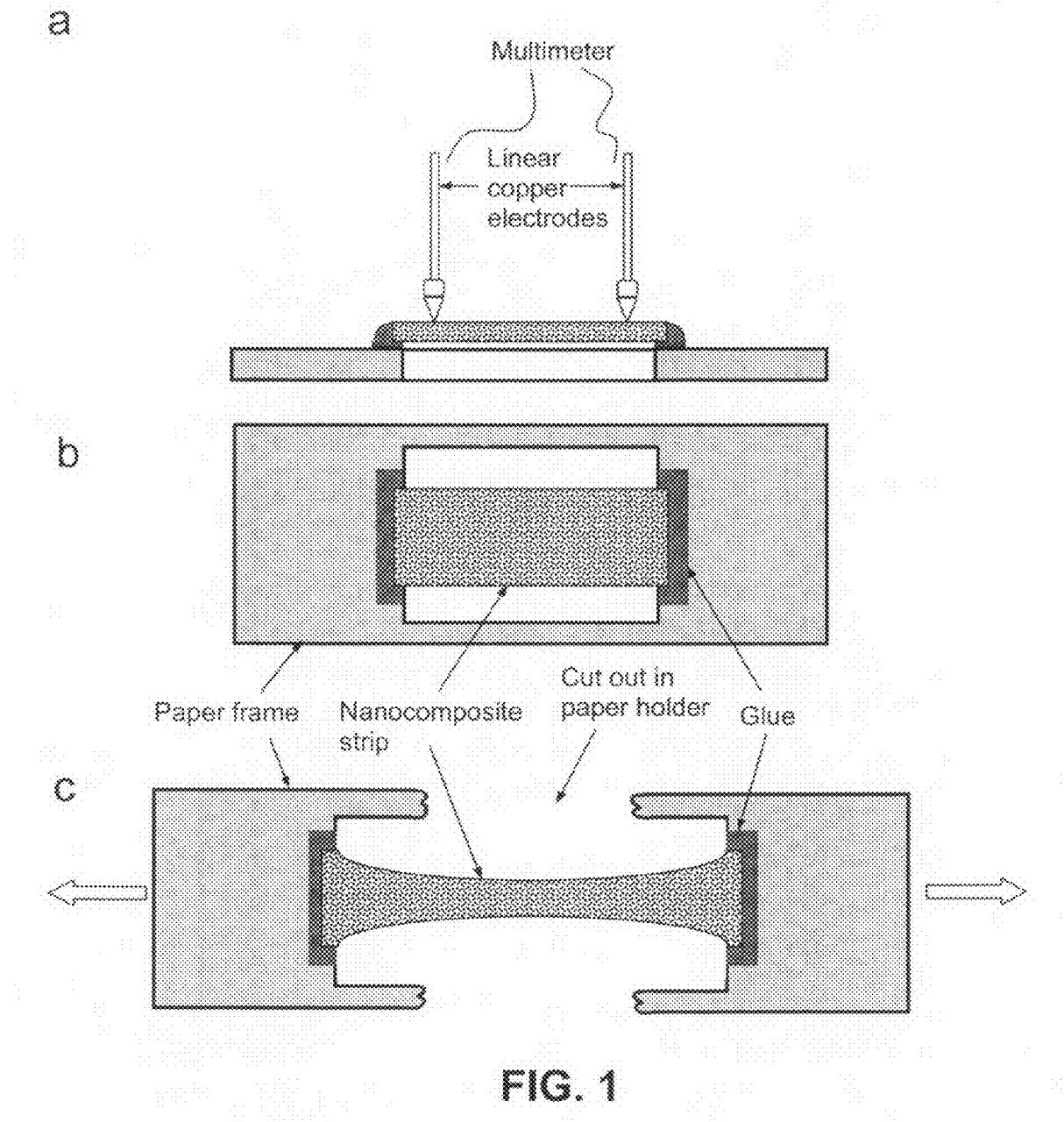
FIGS. 1(a) through 1(c) are diagrams of the apparatus used to measure electrical resistance of nanocomposite strips according to the invention.

The present invention generally relates to methods to provide electrospun polymer/nanoparticle composite-fiber structures for use as lightweight, compliant, porous strain sensors for non-cyclic strain sensing. In one embodiment, the fibers in the nanocomposites comprise, for example, poly($\in$-caprolactone) (PCL) dielectric polymer matrix with embedded electrically conductive carbon black (CB) nanoparticles. In another embodiment, the composite-fiber structures of the present invention contain at least about 7 weight percent or more of CB and are electrically conducting in the as-spun, un-deformed state, and are thus called conductive polymer composites (CPC). In still another embodiment, the electrical resistance of a nanocomposite structure according to the invention increases with strain, and at sufficiently high strains the structure is rendered non-conductive. In one instance, the reduction in conductivity may be attributed to diminishing contacts between carbon black (CB) particles in strained fibers. A reproducible correlation between electrical resistance of the nanocomposite structures and their stretching suggests that they can be used as resistive non-cyclic strain sensors, and can be useful, for example, when embedded in filters, to indicate filter overstretching due to clogging. In addition, a formula is provided to relate permeability of a clogged filter to the strain of an embedded sensor, and in turn to the electrical resistance of the sensor.

CPC can be manufactured in a number of ways. The most common method is melt mixing and casting followed by solidification. This method, however, is inappropriate for flexible sensor applications. Solvent-processing is another method, where the original form of the composite is liquid or gel and can, therefore, be deposited on any flexible substrate or structure by using simple techniques like direct deposition or dip coating. These techniques in general are unable to form permeable fiber/nanoparticle nanocomposites. Electrospinning provides a very good method to prepare conductive polymer nanocomposites consisting of polymer fibers (a few hundred nanometers to a few microns in diameter) with an embedded conducting filler material of choice. It is a robust technique and relatively easy to implement. The resulting polymer fibers with an embedded filler can be manufactured in various forms, including, but not limited to fiber mats (by collecting the fibers on a flat substrate), fiber ropes, strips (collected on a rotating vertical disc), etc., or can be deposited directly on a substrate of preferred, possibly complex geometry. The electrospinning process involves strong elongational flow that can orient filler particle clusters along the fiber axes and results in fibers possessing very high surface-to-volume ratio.

Polymer nanocomposite sensors prepared by electrospinning have received limited attention in contrast to sensors prepared by other processing techniques such as casting. Cast sensors are, in general, dedicated to the development of flexible chemical vapor sensors. Percolation may be used to interpret electrical conductivity of polymer composites beyond a threshold concentration of conductive filler, the percolation threshold, in the un-deformed state. Evaluation of concentration-dependent percolation thresholds has been performed in the past for CPC's prepared by several techniques other than electrospinning, but not for electrospun CPC's.

In chemical analyte vapor sensors, a change in electrical resistance of a CPC film, when exposed to a specific chemical vapor, is used to sense the vapor concentration. Swelling of the composite film upon absorption of the vapor has been suggested as a possible cause of such measurable change in electrical resistance. Swelling is analogous, in a sense, to volumetric mechanical stretching. Such volumetric stretching changes the percolating structure in a composite film, which leads to a change in its electrical resistance. Therefore, the breach of percolation structure due to mechanical deformation of the polymer/filler composite is an underlying cause of the resistance change and can be used for sensing such deformation.

In one aspect of the present invention, a mechanical, non-cyclic, flexible strain sensor is provided. This is provided in contrast to a class of piezoresistive sensors that are intended for reversible strain sensing. The non-cyclic sensors can be employed to measure the fabric deformations in a parachute canopy.

In another aspect of the present invention, the non-cyclic sensors can be employed in, for example, the development of the next-generation large-scale filters capable of self-reporting local clogging data.

In yet another aspect of the present invention, the porous structure of the nanocomposite strips prepared by electrospinning is employed for next-generation large-scale filters capable of self-reporting local clogging data.

Currently, clogging of large-scale filters is detected by monitoring the pressure drop across the filter. A local clog in a filter is, in fact, equivalent to a local load. Therefore, the flexible sensor in accord with the present invention can be sandwiched in filter media and subjected to stretching and respond to the local clogging by displaying a measurable change in its electrical resistance. The non-cyclic, permeable, flexible mechanical strain sensors contemplated herein may be electrospun, nano-composite strips or structures.

In yet another aspect of the invention, the non-cyclic sensors comprise a layered percolation structure. In yet another aspect of the invention, the permeability of a clogged filter section with an embedded nanocomposite strip or a sensor in accord with the invention senses and indicates strain resulting from bending due to an increased pressure difference as a function of its electrical resistance.

The following experiments have been included to demonstrate the sensor in accord with the present invention in one or more possible aspects, but are in no way intended to indicate the only aspect thereof. Other aspects will be apparent to one skilled in the art based on the teaching herein, and are intended to be within the scope hereof.

Materials used in the following examples include CB2000 grade carbon black (Cabot Corporation), polymer Poly(∈-caprolactone) (PCL), $M_n$=80 kDa (Aldrich); and two solvents N,N-dimethylformamide (DMF) anhydrous, 99.8% (Aldrich) and dichloromethane (MC) anhydrous, greater than 99.8% (Aldrich).

Carbon Black-Polymer Suspension Preparation:

A suspension of carbon black (CB) in PCL solution is prepared to electrospin PCL fibers with embedded CB nanoparticles. The following procedure was adopted to prepare the suspensions. First, a measured amount of CB was added to a 60/40 (by weight) mixture of DMF/MC. The mixture was stirred vigorously on a hot plate for 12-16 hours at 40° C. Then, the mixture was sonicated for 90 minutes at the same temperature followed by similar stirring on a hot plate at 40° C. for 4 hours. Then, sonication (90 minutes) and hot plate stirring (4 hours) were repeated once more. Subsequently, a weighed amount of PCL was added and the resulting suspension was stirred for 12 to 16 hours on a hot plate at 65° C., but at a gentle stirring speed to avoid mechanical degradation of the polymer. All of the suspensions used contained 11 weight percent of PCL in 60/40 mixture of DMF/MC by weight. The concentration of CB was varied in the range 7 to 11 weight percent of the polymer weight. The polymer dissolved in the mixture solvents and provided a viscoelastic liquid medium with embedded CB nanoparticles.

Sample Preparation and Electrical Resistance Measurement:

Suspensions, prepared via the method described above, and having various loading of carbon black (CB), were used to electrospin nanocomposite fibers using known electrospinning techniques. The CB-PCL suspension flow rate through a stainless steel capillary was controlled at 0.8 ml/hr by using a precision syringe pump. The electric field strength applied between the capillary and a vertical grounded spinning disc was varied between 0.5 to 0.65 kV/cm. The required electric field strength was lower for higher loadings of CB nanoparticles. The diameter of the nanocomposite polymer fibers with embedded CB nanoparticles was in the range from about a few hundred nanometers to a few micrometers.

In another embodiment, the fibers useful in the present invention have an average diameter in the range of about 1 nanometer to about 25,000 nanometers (25 microns). In another embodiment, the fibers useful in the present invention have an average diameter in the range of about 1 nanometer to about 10,000 nanometers, or about 1 nanometer to about 5,000 nanometers, or about 3 nanometers to about 3,000 nanometers, or about 7 nanometers to about 1,000 nanometers, or even about 10 nanometers to about 500 nanometers. In still another embodiment, the fibers useful in the present invention have an average diameter of less than 25,000 nanometers, or less than 10,000 nanometers, or even less than 5,000 nanometers. In still another embodiment, the fibers useful in the present invention have an average diameter of less than 3,000 nanometers, or less than about 1,000 nanometers, or even less than about 500 nanometers. Additionally, it should be noted that here, as well as elsewhere in the specification and claims, individual range limits can be combined to form additional non-disclosed range limits.

The fibers were collected on a slowly rotating (approximately 20 rpm) aluminum disc with a wide metal strip wrapped about its edge (1.5 cm wide). The slow collection speed ensured the least amount of stretching of the fibers during the collection process. The collection resulted in the formation of partly aligned fibrous nanocomposite strips. The strips were subsequently peeled off the aluminum disc to prepare samples for the electrical resistance measurement.

FIG. 1 shows a schematic of the setup used for measuring the electrical resistance of a nanocomposite strip and its variations with stretching. The two ends of the as-spun 5 to 8 mm×21 to 24 mm rectangular nanocomposite strips were glued on a rectangular thick paper frame (see FIG. 1b). These paper frames were subsequently clamped at their two ends and cut out in the middle to facilitate unencumbered uniaxial stretching of the strip. After the paper frames were severed on their long sides, the paper no longer interfered in the stretching process (see FIG. 1c). The clamps prevented any change in the strip width at its ends during stretching. Since the clamps were imposed on the glued edges of the sample (FIG. 1 does not show the clamps to expose other details), they prevented any strain that might originate from glue creep.

Figure 2:
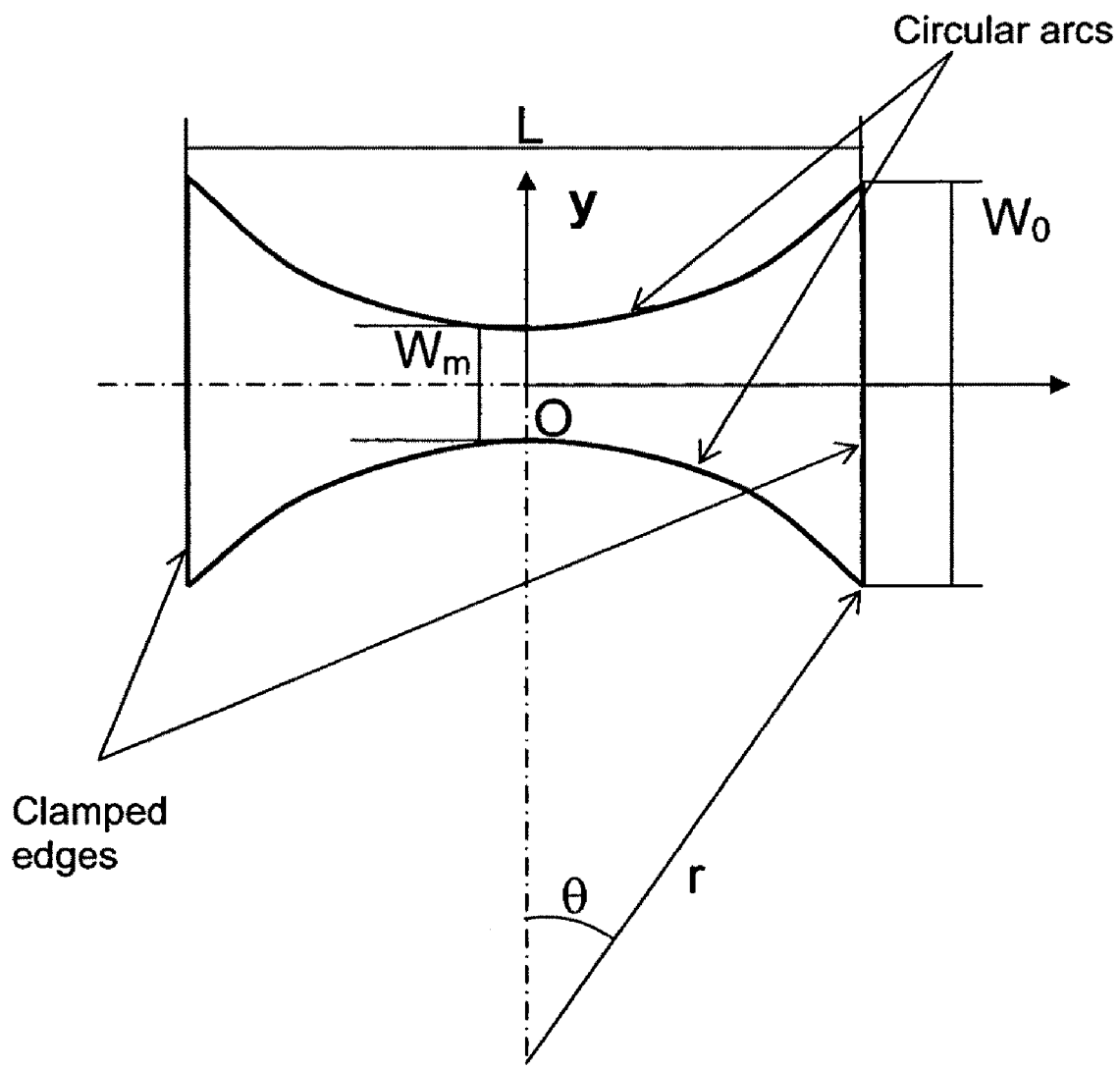
FIG. 2 is a diagram of the deformed configuration of a nanocomposite strip with fixed width $W_0$.

The evolving dimensions of the strip were measured as follows. With reference to FIG. 2, the travel of the underlying sliding stages provided the change in length L of the strip in the stretching direction and a ruler mounted below the sample helped in measuring its minimum width $W_m$, which changed during the stretching process.

Two sharp linear copper electrodes were applied to the samples, being normal to its longer axis and the plane of the strip (FIGS. 1 and 2). The electrodes were lowered from above onto the sample, which was supported from below by a dielectric support against the pressure imposed on it by the electrodes. The inter-electrode distance was $l$=1 cm for any sample length. The electrodes were applied symmetrically about the sample center O (FIG. 2). A good, repeatable contact between the electrodes and the composite fiber strips was ensured by using a micrometer-precision stand to lower the electrodes onto the sample. The electrodes were connected to a Mastech MY64 multimeter for the electrical resistance measurement. The multimeter measures a maximum resistance of 200 MΩ with 5 percent accuracy. Electrical resistance values may potentially overcome this upper limit at sufficiently large sample elongations, when the nanocomposite strips begin to behave as an effectively insulating material.

In one aspect of the present invention, a model of layered percolation is provided for prediction of the electrical resistance of stretched nanocomposite strip samples. The model relates the electrical resistance to strain level.

Specifically, in FIG. 1—FIG. 1(a) is a schematic (side view) of the setup used for measuring the electrical resistance of a nanocomposite strip (shown in contact with two copper electrodes). FIG. 1(b) is a top view of the setup, showing an initially rectangular un-deformed nanocomposite strip with its opposite ends glued on a thick paper frame. The rectangle underneath the strip marks a cut out on the paper frame. FIG. 1(c) is a stretched nanocomposite strip sample. The two narrow bands of the paper frame have been severed to allow unencumbered stretching of the strip.

Turning to a FIG. 2, FIG. 2 is a stretched (deformed) configuration of a nanocomposite fiber strip clamped at its two ends (fixed width $W_0$). The main parameters of the model are shown.

Sample Configuration:

An initially rectangular nanocomposite strip, when being stretched with clamps on its ends (keeping the clamped lateral width constant at $W_0$), acquires a shape with side edges approximated by circular arcs, as shown in FIG. 2. The quantities with subscript 0 denote the initial unstretched configuration. The following two geometric relationships can be seen in FIG. 2:

$$r(1-\cos\theta)=(W_0-W_m)/2 \quad (1a)$$

$$r\sin\theta = L/2 \quad (1b).$$

The subscript m corresponds to a minimum in the sample width (FIG. 2). Dividing Equation (1a) by Equation (1b), results in:

$$\tan(\theta/2)=(W_0-W_m)/L, \quad (2a)$$

$$r=L/(2\sin\theta) \quad (2b).$$

The area of the sample in a stretched configuration as shown in FIG. 2, is given by:

$$S=W_0L-r^2[2\theta-\sin(2\theta)], \quad (3)$$

where $\theta$ is in radians. Initially the sample is rectangular with its area being $S_0=L_0W_0$.

As an example, take $L_0=30$ mm, $W_0=12$ mm, $L=75$ mm and $W_m=4$ mm. Then, from Equation (2a), $\theta=0.2125$ rad and from Equation (2b) $r=177.81$ mm. Equation (3) yields $S=499.13$ mm$^2$, whereas $S_0=360$ mm$^2$; then, the area ratio is $S/S_0=1.39$.

Layered Percolation in Nanofiber Strips with Embedded CB Nanoparticles:

As is noted hereinabove, pure polymer fiber strips are electrically non-conductive. Nanocomposite strips can be rendered conductive by adding CB at concentrations above a certain system-dependent threshold. Nanoparticles create a percolating network. Stretching the nanocomposite strips can affect and restructure these percolating networks leading to a change in the sample resistance. In piezoresistive strain sensors the change in the electrical resistance is primarily related to the change in sensor overall geometry. This is in contrast to the change in percolation structure as exhibited by the sensors according to the present invention. A fibrous nanocomposite strip according to the invention may consist of several layers of nanocomposite fibers, i.e., in depth, normal to the sample plane in FIG. 2. The CB nanoparticles included in the electrospinning solution are distributed in these layers in such a way that the concentration and distribution of the particles in different layers is similar (2D model). This gives rise to a two-dimensional layered percolation structure. Geometric changes due to uniaxial stretching results in changes of the layered percolation structures, each one independent of the others, causing the electrical resistance to change.

The foregoing assumes that CB nanoparticles from different layers do not penetrate the neighboring layers, even though the sample shrinks in the direction normal to its plane in FIG. 2 due to stretching along the x-axis. The electrical resistance of a composite sample is given by $$R = \frac{1}{\sigma}\int_{-l/2}^{l/2}\frac{dx}{s(x)}, \quad (4)$$

where x is the coordinate along the length of the sample (FIG. 2), s the cross-sectional area of the nanocomposite strip at fixed x, $l$ the distance between the linear copper electrodes employed to measure the electrical resistance, and $\sigma$ the sample's electrical conductivity. The cross-sectional area s(x), is equal to hW(x), wherein h is the sample thickness and W(x) is the sample width. Thus, Equation (4) becomes:

$$R = \frac{1}{\sigma}\frac{1}{h}\int_{-l/2}^{l/2}\frac{dx}{W(x)} \quad (5)$$

This demonstrates that the sample volume is conserved during the stretching process. Then, $$h=(L_0W_0h_0)/S=(S_0/S)h_0, \quad (6)$$

where the top view area S of the sample can be determined from Equation (3).

The electrical conductivity of the nanocomposite close to the loss of conductivity is given by the percolation theory as:

$$\sigma/\sigma_{CB}=A(p-p_c)^\mu, \quad (7)$$

where p represents the probability of a particular site in a horizontal layer in the sample being occupied by a CB particle, $p_c$ the threshold value of p that must be exceeded to obtain a percolating network of the conducting particles spanning the whole layer in the sample between the electrodes, $\mu$ the percolation exponent, and A the dimensionless scaling prefactor. The strip electrical conductivity has been normalized with the conductivity of CB particles, $\sigma_{CB}$, which is approximately 0.1 1/($\Omega$-cm) for CB2000 grade carbon black particles.

Substituting Equation (7) into Equation (5), $$R = \frac{(p-p_c)^{-\mu}}{A\sigma_{CB}}\frac{I_1}{h}, \quad I_1 = \int_{-l/2}^{l/2}\frac{dx}{W(x)}. \quad (8)$$

For the circular-arc approximation of the sample side configuration $$W(x) = W_m + 2[r-(r^2-x^2)^{1/2}]. \quad (9)$$

Then, the integral in Equation (8) takes the form:

$$I_1 = \int_{-l/2}^{l/2}\frac{dx}{W(x)} = [\cos^{-1}(l/2r)-(\pi/2)] - \frac{(W_m+2r)}{[(W_m/2+r)^2-r^2]^{1/2}}\left[\tan^{-1}\left\{\frac{(W_m/2+r)\tan[\cos^{-1}(l/2r)/2]-r}{[(W_m/2+r)^2-r^2]^{1/2}}\right\} - \tan^{-1}\left\{\frac{W_m/2}{[(W_m/2+r)^2-r^2]^{1/2}}\right\}\right]. \quad (10)$$

Combining Equations (6), (8) and (10), one arrives at:

$$R = \frac{(p-p_c)^{-\mu}}{A\sigma_{CB}} \frac{S}{S_0 h_0} I_1. \quad (11)$$

In the layered-percolation model, the particle-related conductivity is based on a two-dimensional percolation pattern. Then, the probability of a site to be occupied by a CB particle can be expressed as:

$$p = \frac{\sum S_i}{S}, \quad (12)$$

where $\Sigma S_i$ is the total median cross-sectional area of the particles in a layer at a certain depth. Since particles stay within the same layer through deformation, $\Sigma S_i$ remains constant. In addition, the sample area S (in the top view of FIG. 2) increases with stretching. An increase in S would reduce p, which eventually should fall below the threshold value $p_c$ making the sample non-conducting. Therefore in Equation (11) the effect of stretching on the electrical resistance is two-fold: R~S corresponds to the thickness shrinkage. On the other hand, R~$[p(S)-p_c]^{-\mu}$ is due to the rearrangement of the percolation carbon black (CB) network because of stretching.

Let $N_{CB}$ be the number of CB nanoparticles present in a layer of thickness h=2a, with "a" being the nominal particle radius. The particle volume in the layer is:

$$V_{CB} = \frac{4}{3}\pi a^3 N_{CB} = (L_0 W_0 2a)\phi_0, \quad (13)$$

where $\phi_0$ represents the initial volume fraction of CB particles in the unstretched sample, which can be related to the weight (particle to polymer) fraction of the CB particles $c_{CB}$ via $$\phi_0 = \frac{c_{CB}\rho_p}{c_{CB}\rho_p + (1-c_{CB})\rho_{CB}} \quad (14)$$

In Equation (14) $\rho_p$ and $\rho_{CB}$ are the polymer and carbon black densities, respectively. The following values. $\rho_p$=1.145 g/cm$^3$ and $\rho_{CB}$=2.3 g/cm$^3$, according to manufacturer's specification, are used herein.

By definition, $\Sigma S_i = \pi a^2 N_{CB}$. Then, Equations (13) and (14) yield:

$$\sum S_i = \frac{3}{2}S_0\left[\frac{c_{CB}\rho_p}{c_{CB}\rho_p + (1-c_{CB})\rho_{CB}}\right]. \quad (15)$$

Thus, using Equations (12) and (15), we obtain:

$$p = \frac{3}{2}\frac{S_0}{S}\left[\frac{c_{CB}\rho_p}{c_{CB}\rho_p + (1-c_{CB})\rho_{CB}}\right]. \quad (16)$$

Equation (16) relates p with S, where S is determined via Equation (3).

Local Clogging of Filters with an Embedded Nanocomposite Strip (Sensor):

A clogged element of a large-scale filter subject to a fluid flow with a fixed throughput experiences an increased pressure drop across it due to increased hydraulic resistance. As a result, an initially planar filter would experience localized bulging accompanied by bending of the surrounding area. If a nanocomposite strip according to the invention is embedded in the filter medium, it could be used as a sensor reporting on the localized bulging and bending by its increased electrical resistance. Such information could help in timely replacement of the clogged element, whereas the unclogged portions of the filter could stay in efficient use. This might be beneficial for large-scale (high-cost) industrial filters, which are generally monitored by only overall pressure drop. This general type of global monitoring requires replacement of the whole filter, even though a significant part of the filter could still be fully functional.

Because filter permeability is related to stretching caused by bending, and the electrical conductivity of an embedded sensor is related to stretching, it is possible to relate filter permeability directly with sensor electrical resistance.

Consider, for example, the simplest case of two-dimensional filter bending under the action of a centrally applied point force f arising due to localized clogging. The un-deformed filter strip (length $L_0$) is assumed to be straight, clamped at the edge. The force acts normally to the central section of the strip and results in its bending. In the framework of the Euler-Bernoulli beam theory it is easy to find that the normalized length $L/L_0$ of the bending filter with an embedded sensor is:

$$\frac{L}{L} = \frac{4}{\sqrt{F}}\int_{\theta_0}^{\pi/2}\frac{d\zeta}{(\cos\zeta_0 - \cos\zeta)^{1/2}} \quad (17)$$

where $F=fL_0^2/EI$ is the dimensionless force and $\cos\theta_0=F/64$. The filter with the embedded sensor is assumed to be an elastic medium possessing Young's modulus E; the cross-sectional moment of inertia is denoted by I; for the sake of brevity $\zeta$ could be considered as a dummy variable. Smooth configurations assumed here are possible only for sufficiently small force F<64. Otherwise, configurations cusped at the center should emerge.

The effective tensile strain of the filter is given by $\in = (L-L_0)/L_0$. The integral on the right-hand side in Equation (17) is related to the incomplete elliptic integral of the first kind $$F: \int\frac{d\gamma}{\sqrt{1-n^2\sin\gamma}} = \frac{1}{n}F\left[\sin^{-1}(n\sin\gamma),\frac{1}{n}\right] \text{ for } n > 1.$$

Then, Equation (17) takes the form:

$$\varepsilon = 4\left(\frac{2}{F}\right)^{1/2}\left\{F\left[\sin^{-1}\left(n\sin\frac{\pi-\theta_0}{2}\right),\frac{1}{n}\right] - F\left[\sin^{-1}\left(\frac{n}{\sqrt{2}}\right),\frac{1}{n}\right]\right\} - 1, \quad (18)$$

with n being $$n = \left(\frac{2}{1+\cos\theta_0}\right)^{1/2}, \quad (19)$$

Equation (18) relates the strain of the strip with a point load applied at the center. It can be accurately approximated by the following simple polynomial approximation $$\varepsilon = \sum_{i=0}^{9} a_i F^i, \quad (20)$$

where the values of the fit parameters are $a_0$=0, $a_1$=0.136, $a_2$=-4.749, $a_3$=65.878, $a_4$=-420.145, $a_5$=1476.124, $a_6$=-2999.85, $a_7$=3512.603, $a_8$=-2198.25 and $a_9$=569.539. The superscript i on F denotes an exponent.

Equation (20) describes stretching due to bending by a central point force resulting from filter clogging. The electrical resistance of the embedded nanocomposite sensor strip will increase due to this strain, similar to its increase due to planar stretching as presented above. Therefore, to relate the electrical resistance of the embedded sensor strip to the load F associated with clogging, one needs to express the probability p or the sensor area S with ∈ in planar stretching. Assume, for the moment, that deviations of the clamped strip configuration from the rectangular one during the whole stretching process are insignificant, thus strip width remains constant, and $S_0/S = \in +1$ in Equation (16) takes the following form:

$$p = \frac{3}{2}\phi_0(1+\varepsilon), \quad (21)$$

where $\phi_0$ is given by Equation (14).

Using Equation (21) and evaluating the integral $I_1$ in Equation (8) with $W=W_0$, $$\overline{R} = \frac{1}{A}\frac{1}{W_0}\frac{L_0}{h_0}\left[\frac{3}{2}\phi_0(1+\varepsilon) - p_c\right]^{-\mu}(1+\varepsilon)^{-1}, \quad (22)$$

where $\overline{R} = R\sigma_{cb}L_0$ represents the dimensionless electrical resistance of the sensor strip. Equation (22) can be used to express the electrical resistance in terms of the imposed load using Equation (20) as $$\overline{R} = \frac{1}{A}\frac{1}{W_0}\frac{L_0}{h_0}\left[\frac{3}{2}\phi_0\left(1 + \sum_{i=0}^{9} a_i F^i\right) - p_c\right]^{-\mu}\left(1 + \sum_{i=0}^{9} a_i F^i\right)^{-1}. \quad (23)$$

The force (per unit width) due to clogging of a filter element of length b along the strip is $$f = \Delta Pb, \quad (24)$$

where $\Delta P$ is the pressure drop across the filter.

Due to Darcy's law the volumetric flow rate per unit width Q, which is considered to be constant is given as $Q = kb\Delta P/(\eta h_f)$, where k is the filter permeability, $\eta$ the viscosity of the fluid moving through the filter, and $h_f$ the filter thickness. Then, $$F = \frac{1}{K}, \quad (25)$$

where $K = kEI/(Q\eta h_f L_0^2)$ is the dimensionless permeability.

Substituting Equation (25) into Equation (23), we obtain:

$$\overline{R} = \frac{1}{A}\frac{1}{W_0}\frac{L_0}{h_0}\left[\frac{3}{2}\phi_0\left(1 + \sum_{i=0}^{9} a_i/K^i\right) - p_c\right]^{-\mu}\left(1 + \sum_{i=0}^{9} a_i/K^i\right)^{-1}, \quad (26)$$

which relates the dimensionless filter permeability K with the electrical resistance of the embedded sensor $\overline{R}$. It is emphasized that the superscript i for K in Equation (26) is an exponent.

The experimental data for the electrical resistance of PCL/CB nanocomposite strips according to the invention, and at different, increasing sample stretching ratios were processed as R=R(p) using the experimental setup described above and p calculated using Equations (3) and (16) for any given stretching. The experimental data is presented by symbols in FIGS. 3 through 7, which show only the measurement results that are sufficiently close to the percolation and conductivity loss.

Figure 3:
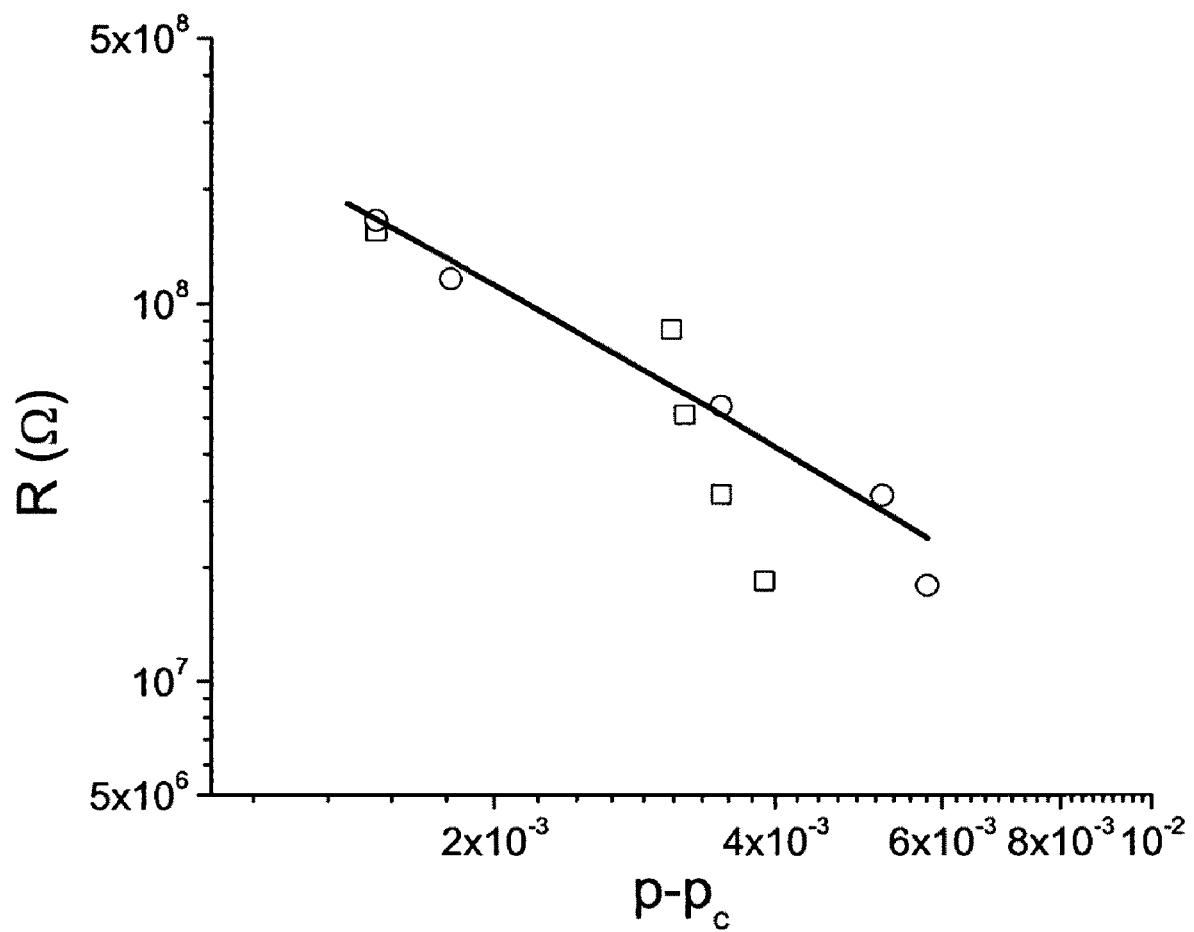
FIG. 3 is a graph of electrical resistance versus cite occupation probability for nanocomposite strips according to the invention with 7 weight percent carbon black (CB)

Specifically, FIG. 3 is a graph illustrating electrical resistance versus site occupation probability p (calculated using the sample length L and Equations (3) and (16)) for nanocomposite samples with embedded 7 weight percent CB nanoparticles in PCL fibers. PCL concentration in the electrospun suspension was 11 weight percent. The line shows fitting using Equation (11). The symbols (squares and circles) correspond to experimental data for two different samples.

Figure 4:
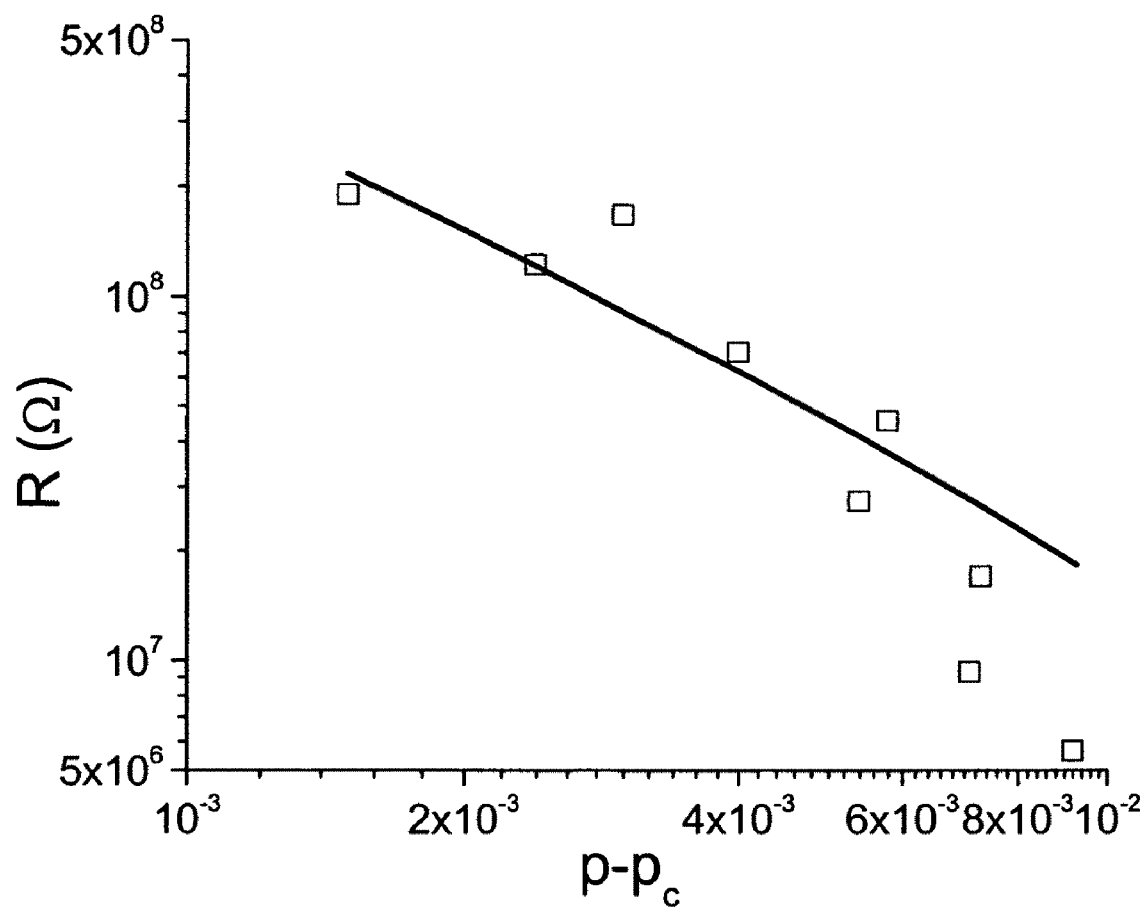
FIG. 4 is a graph of electrical resistance versus cite occupation probability for nanocomposite strips according to the invention with 8 weight percent carbon black (CB)

Turning to FIG. 4, FIG. 4 is a graph illustrating electrical resistance versus site occupation probability p (calculated using the sample length L and Equations (3) and (16)) for nanocomposite sample with embedded 8 weight percent CB nanoparticles in PCL fibers. PCL concentration in the electrospun suspension was 11 weight percent. The line shows fitting using Equation (11). The symbols (squares) correspond to experimental data.

Figure 5:
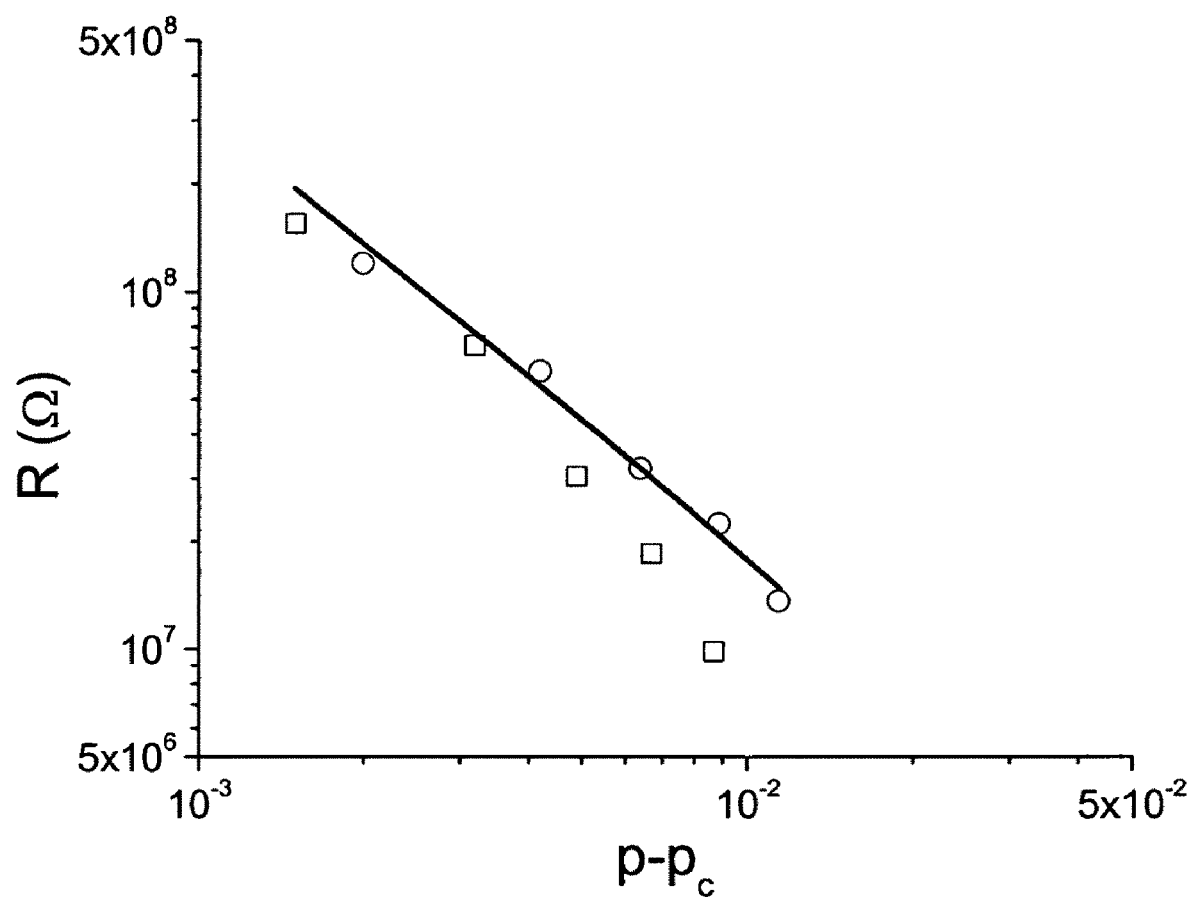
FIG. 5 is a graph of electrical resistance versus cite occupation probability for nanocomposite strips according to the invention with 9 weight percent carbon black (CB)

Turning to FIG. 5, FIG. 5 is a graph illustrating electrical resistance versus site occupation probability p (calculated using the sample length L and Equations (3) and (16)) for nanocomposite samples with embedded 9 weight percent CB nanoparticles in PCL fibers. PCL concentration in the electrospun suspension was 11 weight percent. The line shows fitting using Equation (11). The symbols (squares and circles) correspond to experimental data for two different samples.

Figure 6:
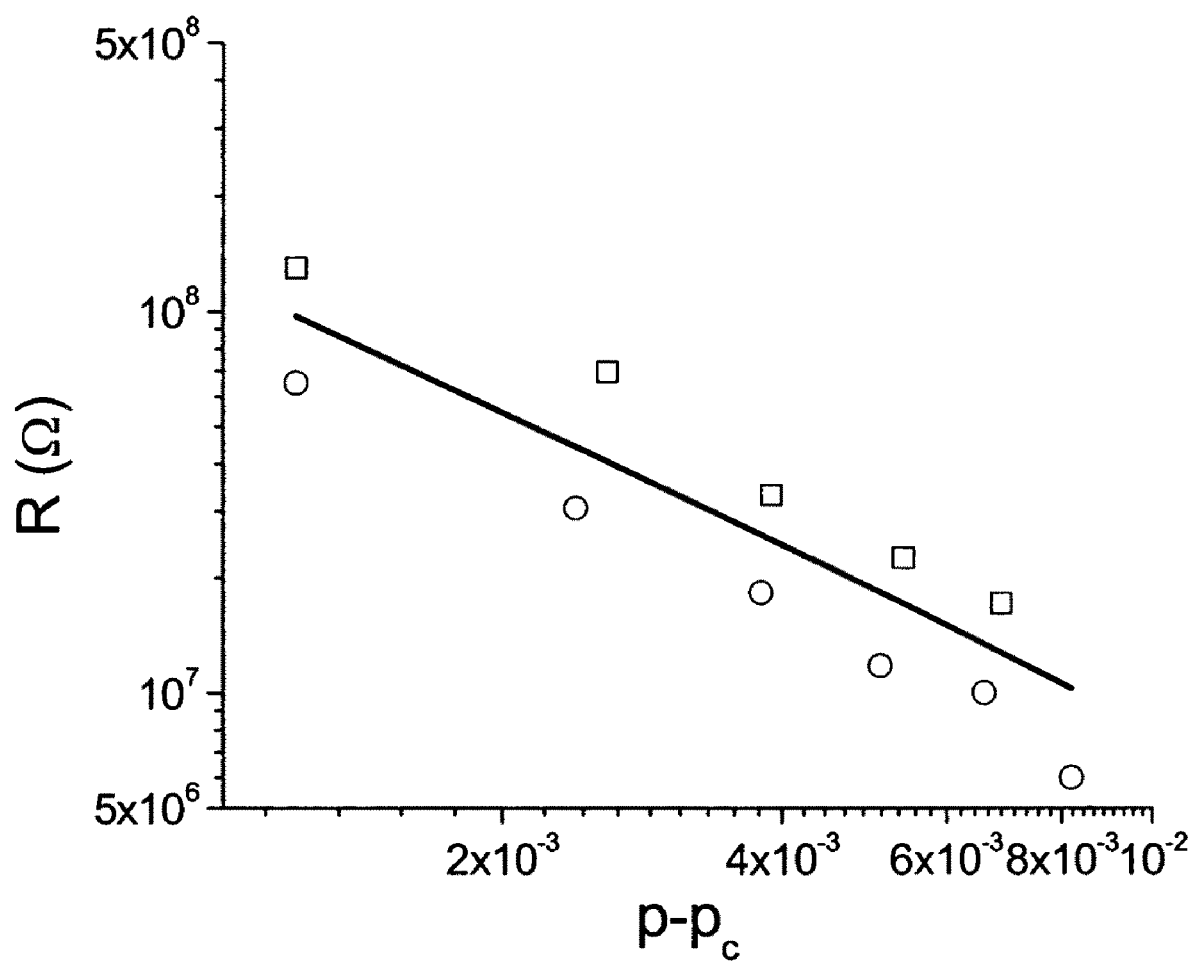
FIG. 6 is a graph of electrical resistance versus cite occupation probability for nanocomposite strips according to the invention with 10 weight percent carbon black (CB)

Turning to FIG. 6, FIG. 6 is a graph illustrating electrical resistance versus site occupation probability p (calculated using the sample length L and Equations (3) and (16)) for nanocomposite samples with embedded 10 weight percent CB nanoparticles in PCL fibers. PCL concentration in the electrospun suspension was 11 weight percent. The line shows fitting using Equation (11). The symbols (squares and circles) correspond to experimental data for two different samples.

Figure 7:
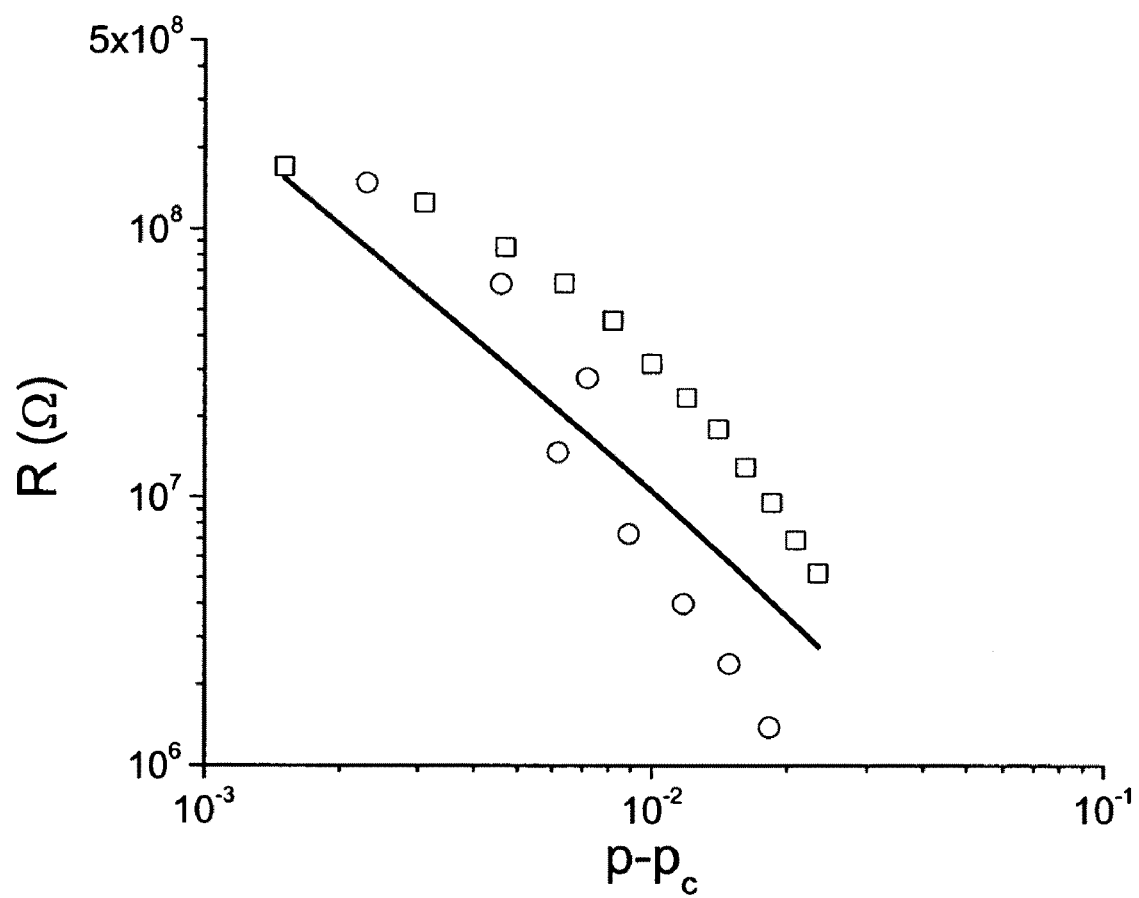
FIG. 7 is a graph of electrical resistance versus cite occupation probability for nanocomposite strips according to the invention with 11 weight percent carbon black (CB)

Turning to FIG. 7, FIG. 7 is a graph illustrating electrical resistance versus site occupation probability p (calculated using the sample length L and Equations (3) and (16)) for nanocomposite samples with embedded 11 weight percent CB nanoparticles in PCL fibers. PCL concentration in the electrospun suspension was 11 weight percent. The line shows fitting using Equation (11). The symbols (squares and circles) correspond to experimental data for two different samples.

In such cases, the circular-arc approximation (Equations (2) and (3)) is sufficiently accurate and also the scaling law (Equation (11)) is justified. Two sets of measurements for two identical samples are presented to illustrate the degree of repeatability of these measurements. All samples with 8 weight percent CB, except the one for which data is presented in FIG. 4, undergo visible delamination at strong stretching. Therefore, FIG. 4 details the results for only one sample. FIGS. 3 through 7 also present the line fits to the experimental data. The lines were produced by using the average values of the parameters obtained by fitting Equation (11), with p defined from Equations (16) and (3), to the individual sets of experimental data at any CB loading. Essentially, this relates the electrical resistance to the stretched length of the sample L or its strain, which, in fact, fully determines p. The fitting process helps in determining the parameters A, $p_c$ and $\mu$ involved in Equation (11). Obviously, Equation (11) yields $R \to \infty$ as $p \to p_c$, i.e., when the percolation threshold is reached due to sample stretching. At the threshold, the sample becomes non-conductive. Therefore, we can roughly attribute $p_c$ to the final reading in our measurements when R becomes effectively infinite at a certain value of the sample length L and a corresponding strain. With $p_c$ so evaluated, the least square technique was used to obtain the best fit of Equation (11) to the data, and to find the value of the percolation exponent μ and the prefactor A.

Figure 8:
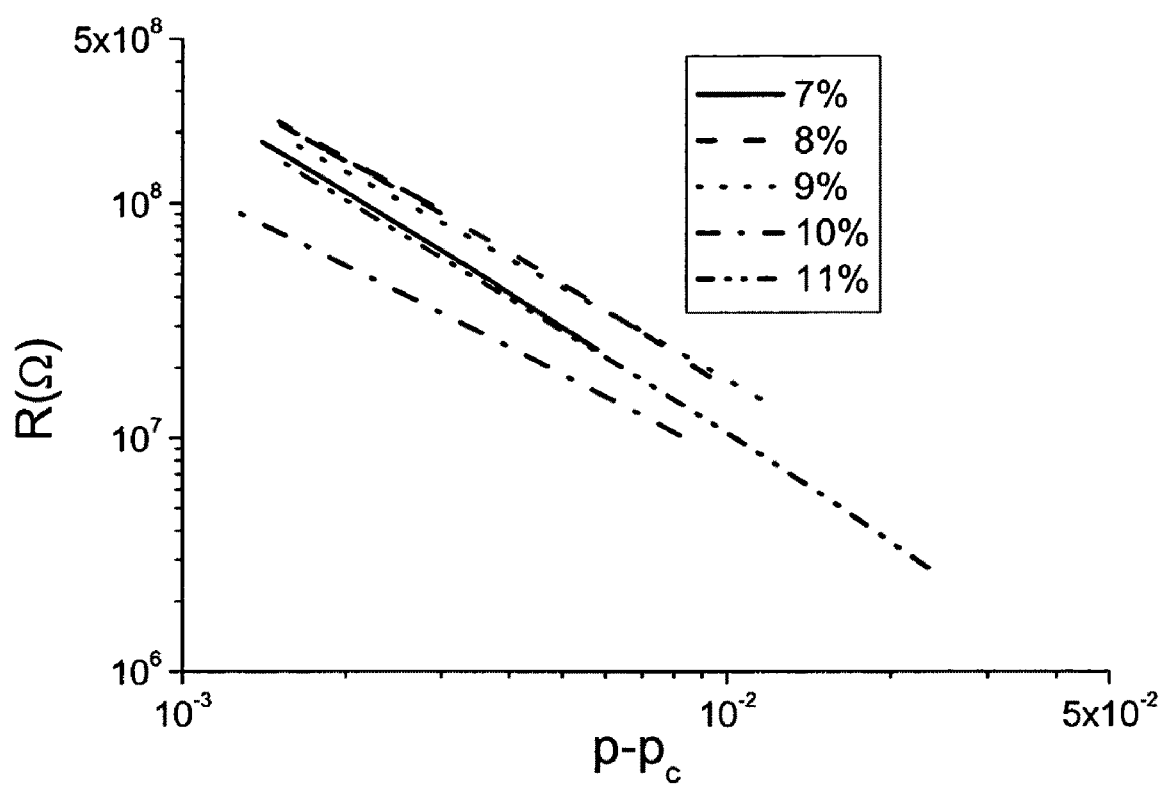
FIG. 8 is a cumulative plot of the graphs of FIGS. 3 through 7.

In the logarithmic plots presented in FIGS. 3 through 7, the experimental data show some scatter for the values of $(p-p_c)$ away from zero. However, as $p \rightarrow p_c$, i.e. near the percolation threshold, the dependence becomes essentially linear. The data indicate a monotonic increase in the electrical resistance with sample stretching approaching the percolation threshold. In FIG. 8, the fitting lines from FIGS. 3 through 7 are presented in a cumulative plot for comparing the electrical resistance change as a function of uniaxial stretching of nanocomposite strip samples with different CB content. The results show essentially the same slope in the dependences log R=f[log(p-$p_c$)] for samples with different CB content. Deviations from linearity in such dependences in FIGS. 3 through 8, if any, are related to the fact that not only the variations in the percolating two-dimensional CB network contribute to R, but also the sample shrinkage in the normal direction (depth) due to stretching.

Turning to FIG. 8, FIG. 8 is a graph illustrating a cumulative (FIGS. 3 through 7) plot of the fitting lines for the electrical resistance versus probability (p-$p_c$) for PCL/CB nanocomposite strips at different CB loadings.

In Table 1 the values of the threshold and scaling parameters corresponding to the fitting lines in FIGS. 3 through 8 are shown. The prefactor A by its nature can obviously vary with the CB loading. However, the values of the threshold and scaling parameters $p_c$ and μ are geometric in their nature and should be functions of only percolation networks forming inside the samples. Therefore, their values should be similar for samples with different CB content.

TABLE 1

| CB Content | Threshold and scaling parameters | | |
|---|---|---|---|
| (Wt % of polymer) | $p_c$ | μ | A |
| 7 | 0.0459 | 1.31 | 0.02 |
| 8 | 0.0530 | 1.16 | 0.01 |
| 9 | 0.0555 | 1.18 | 0.015 |
| 10 | 0.0450 | 1.10 | 0.013 |
| 11 | 0.0701 | 1.34 | 0.053 |

According to Table 1, the average value of the percolation exponent μ is 1.22±0.12. This is very close to the value of 1.3, the theoretically predicted value for μ. The average value of percolation threshold $p_c$ according to Table 1 is 0.054±0.02. This value of $p_c$ is much lower than the theoretical values predicted for two-dimensional statistically random distributions of spherical particles in a matrix. The theoretical values for $p_c$ are 0.34729 or higher for two-dimensional percolation, depending on the type of percolation lattice (triangular, square or honeycomb) and percolation type (site or bond).

However, lower than theoretical percolation thresholds are well-known and have been reported by several groups in relation to various conducting polymer composites. The percolation theory assumes a random distribution of particles in a matrix. However, the percolation structure developing in fibrous nanocomposite strips containing CB nanoparticles can be far from random and can be a very strong function of the aggregation properties of CB in the polymer matrix.

In addition, processing of the composites can influence the formation of the percolation networks and particle clusters and reduce the threshold concentration of CB nanoparticles needed to form a percolating network. The shape of conducting filler particles also influences the threshold, with the elongated particles (like CNT or carbon fibers) producing ultra-low values compared to the theoretical limit. The particle shape obviously affects cluster formation and thus the overall percolation. This suggests that in order to gain insight into the percolating structure developing in the oriented nanocomposite strips, one needs to consider the nature of CB particle distribution in the individual fibers constituting these strips.

Figure 9:
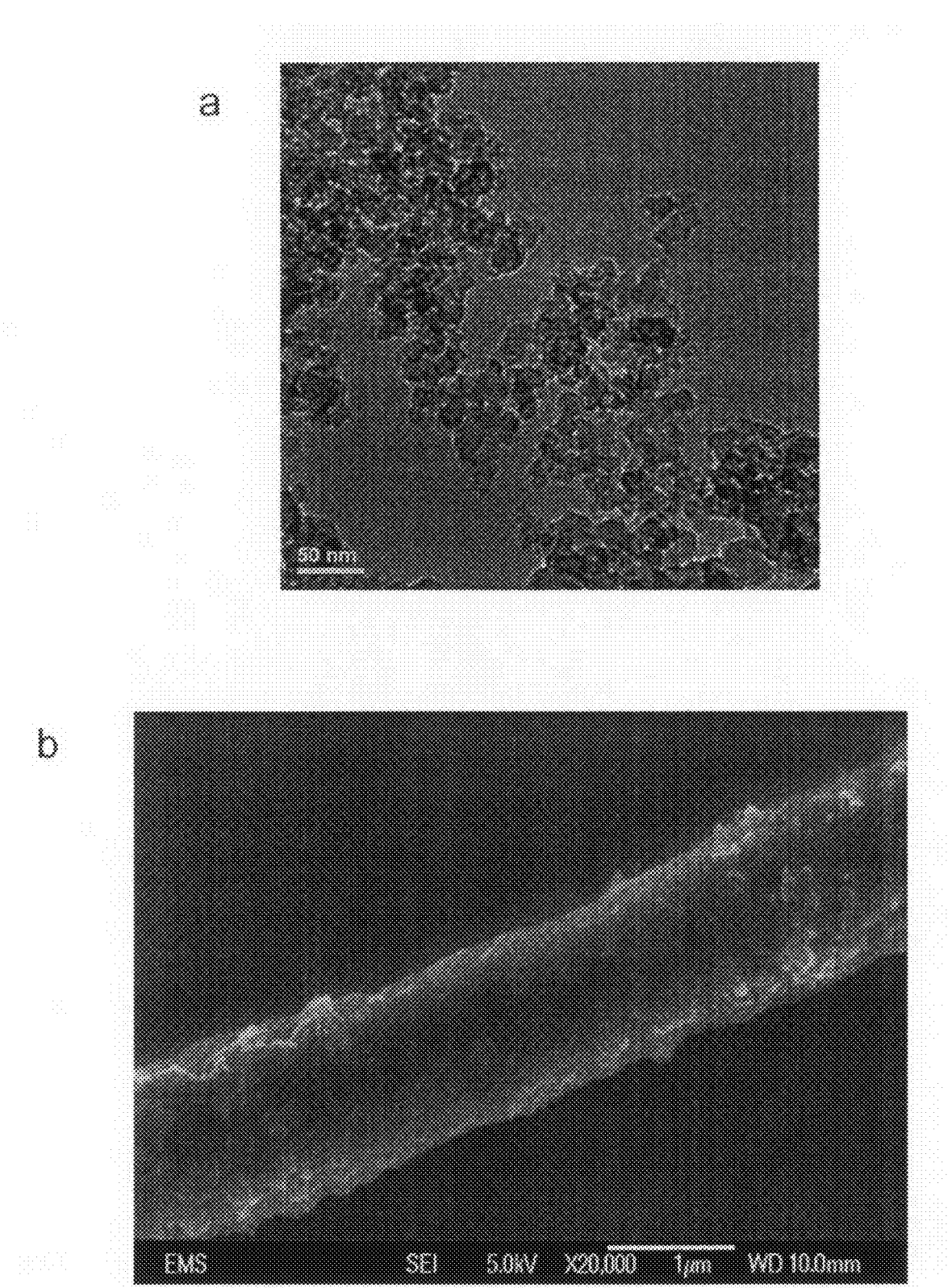
FIG. 9(a) is a TEM image of carbon black (CB) clusters on a carbon substrate supported by a TEM grid.
FIG. 9(b) is an SEM micrograph of PCL fiber with 10 weight percent embedded carbon black (CB) nanoparticles.

FIG. 9a shows a TEM image of clusters of CB particles deposited on a TEM grid. The sample for TEM imaging was obtained following the procedure described above without its polymer-related step. The resulting dilute suspension was subjected to further sonication and mechanical stirring. Then, a small drop of this suspension was deposited on a TEM grid by means of a pipette tip. FIG. 9a clearly shows that CB nanoparticles form clusters (aggregates) even after vigorous mixing. The aggregation of CB particles seen in FIG. 9a suggests that CB in the electrospun polymer solutions would also be in aggregated form.

It is well known that the electrospinning process involves very high elongation rates (approximately 1000 s$^{-1}$) and jet cross-sectional area reduction by six orders of magnitude. Under such conditions, CB clusters should be aligned along the electrospun fibers, as with carbon nanotubes. Also, the applied electrical field during the electrospinning process would cause CB clusters to become polarized which should facilitate their axial alignment. FIG. 9b is a SEM micrograph of a nanocomposite polymer (PCL) fiber with 10 weight percent CB content. Addition of CB makes the fiber conductive; it was not possible to resolve the structure of the CB particles inside the fiber. However, conducting CB nanoparticle clusters on the surface are easily distinguishable and appear as bright pellets in the image. The presence of CB clusters in the nanocomposite fibers, combined with the geometry of the fibers themselves (very large aspect ratio) indicate that percolation of CB nanoparticles in such a system should be similar to the percolation of elongated conducting particles in a polymer matrix. The percolation threshold in such a system will be very different from the one in the case of percolation in a random system with spherical particles and can result in lower values of the percolation threshold $p_c$.

Figure 10:
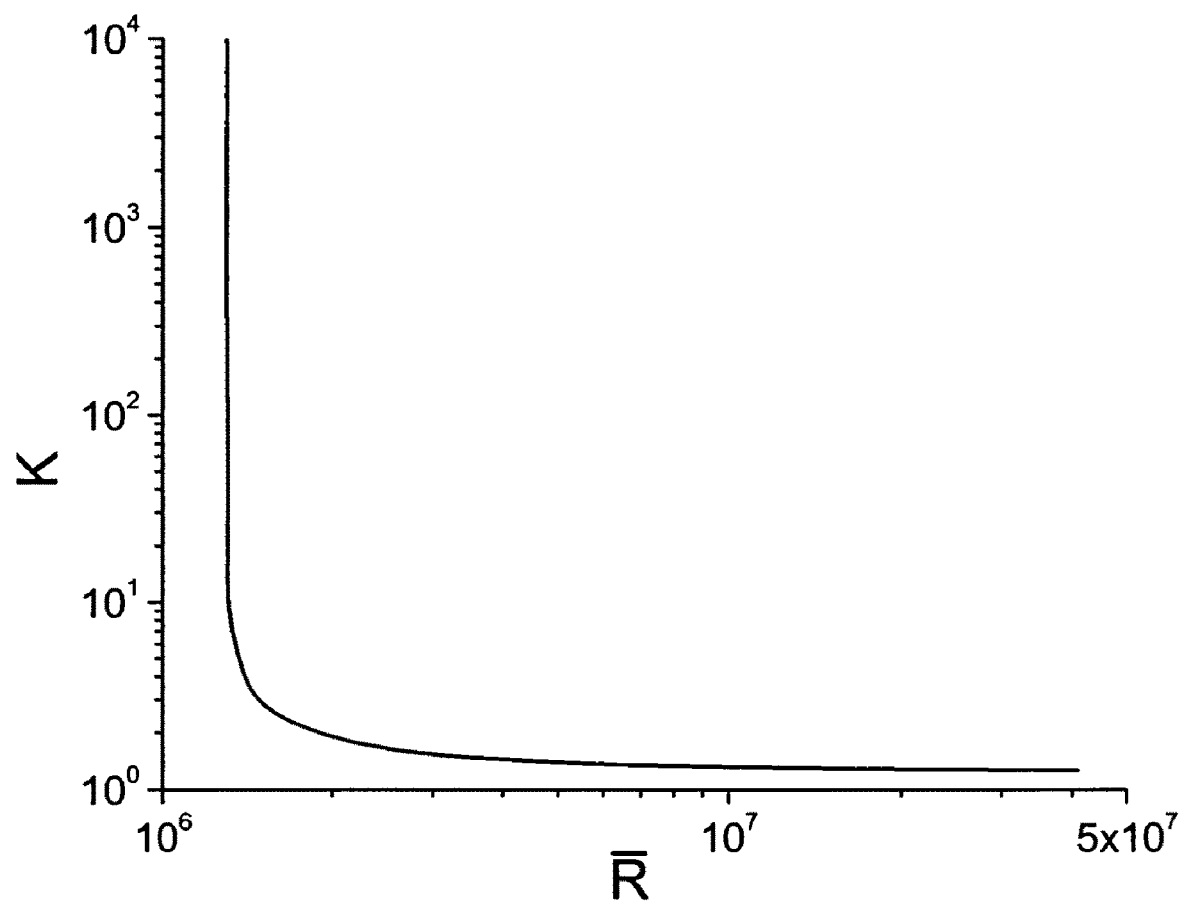
FIG. 10 is a graph of dimensionless permeability K of a filter versus dimensionless electrical resistance $\overline{R}$.

The primary result of the theoretical considerations of the effect of local filter clogging on the electrical resistance of the embedded nanocomposite sensor is seen with reference to FIG. 10. FIG. 10 depicts the dependence of the dimensionless permeability K of the nanocomposite sensor (embedded in the filter) on its dimensionless electrical resistance $\bar{R}$. The curve has been created using Equation (26) and represents the working curve of permeable nanocomposite sensors embedded in filters. As the embedded sensor is stretched due to filter clogging, with simultaneous reduction in filter permeability, the sensor resistance increases up to a point where it becomes infinite.

It has been demonstrated that fibrous nanocomposite strips with embedded carbon black (CB) nanoparticles manifest a reproducible dependence of their electrical resistance R on their strain in uniaxial elongation. The resistance R significantly increases with stretching and the samples become non-conductive as the percolation threshold is reached. The nanocomposite strips were prepared by electrospinning suspensions of CB nanoparticles in polymer solution (11 weight percent of poly (∈-caprolactone) in 60/40 DMF/MC solvent) having different CB loadings (7 to 11 weight percent). Stretching of the nanocomposite strips changes the percolation structure of CB nanoparticles and also shrinks the thickness, thus, changing the electrical resistance of the system. The results are interpreted in the framework of the percolation theory. A reasonable agreement between theoretical predictions and experimental data allowed evaluation of the critical scaling parameters in the dependence of the electrical resistance R. In particular, the scaling law for R was found to be very close to the theoretical one, while the percolation threshold to non-conductivity appeared to be below the theoretical one.

Permeable, flexible, nanocomposite strips with embedded carbon black particles can be incorporated into filters, thus serving as sensors of localized clogging. An analytical relation between filter permeability and electrical resistance of an embedded nanocomposite sensor has been demonstrated. As a result, such nanocomposite strips can be used as non-cyclic, flexible, permeable mechanical sensors.

Given the above, in one embodiment the present invention relates to a strain sensor comprising: (a) at least one conductive electrospun fiber portion containing therein or thereon at least one conductive compound, wherein the at least one conductive electrospun fiber portion is mounted on a substrate, or freely suspended, via at least two contact points; (b) at least one electric current and/or voltage sensing device that is designed to provide an electric current and/or voltage to the at least one conductive electrospun fiber portion via at least two appropriately spaced contact points; and (c) at least one electric current and/or voltage calculation and/or observation means, wherein the electric current and/or voltage sensing device is designed to monitor the electric current and/or voltage through the at least one conductive electrospun portion, and in conjunction with the at least one electric current and/or voltage calculation and/or observation means permits one to monitor the strain that exists in the at least one conductive electrospun fiber portion of the strain sensor.

In one instance, the at least one electric current and/or voltage calculation and/or observation means includes, but is not limited to, a computer, gauge, or oscilloscope. In one embodiment, the at least one conductive compound includes, but is not limited to, carbon black, nanoparticles of carbon black, metal particles formed from one or more conductive metals or conductive metal alloys, metal nanoparticles formed from one or more conductive metals or conductive metal alloys, other conductive non-metallic particles or nanoparticles, or any suitable combination of two or more thereof.

In one instance, the at least one conductive electrospun fiber portion of this embodiment contains about 5 to about 15 weight percent of carbon black, or about 7 to about 13 weight percent of carbon black, or even about 7 to about 11 weight percent of carbon black. Additionally, it should be noted that here, as well as elsewhere in the specification and claims, individual range limits can be combined to form additional non-disclosed range limits.

In one embodiment, the at least one conductive electrospun fiber portion is formed from a combination of at least one polymer compound and the at least one conductive compound. In one instance, the at least one polymer compound is selected from, but not limited to, one or more polymers or copolymers of polyethylene, polypropylene, polycaprolactone, polystyrene, polyethylene oxide, nylon, polyacetal, polysulfone, polybutylene, polyurethane, polyetherimide, polyetherketone, polyphthalamide, polyimide, poly(vinyl acetate), polyacrylonitrile, polyvinylidene fluoride, polylactic acid, carboxymethylcellulose, polytrimethylene terephthalate, or suitable co-polymers of two or more thereof.

In another embodiment, a strain-sensor according to the present invention comprises: (i) a first conductive fiber layer, the first conductive fiber layer having a top surface and a bottom surface; (ii) a filter layer, the filter layer having a top surface and a bottom surface where the top surface of the filter layer is in contact with the bottom surface of the first conductive layer; (iii) a second conductive fiber layer, the second conductive fiber layer having a top surface and a bottom surface where the top surface of the second conductive fiber layer is in contact with the bottom surface of the filter layer; (iv) at least one electric current and/or voltage sensing device that is designed to provide an electric current and/or voltage to the combination of the first conductive fiber layer, the filter layer, and the second conductive fiber layer via at least two appropriately spaced contact points; and (v) at least one electric current and/or voltage calculation and/or observation means, wherein the electric current and/or voltage sensing device is designed to monitor the electric current and/or voltage through the combination of the first conductive fiber layer, the filter layer, and the second conductive fiber layer, and in conjunction with the at least one calculation means permits one to monitor the strain that exists in the strain sensor.

In one instance, the at least one electric current and/or voltage calculation and/or observation means includes, but is not limited to, a computer, gauge, or oscilloscope. In one instance, the first and second conductive fiber layers are each formed from electrospinning a combination of at least one polymer compound and at least one conductive compound. In one instance, the at least one polymer compound is selected from, but not limited to, one or more polymers or copolymers of polyethylene, polypropylene, polycaprolactone, polystyrene, polyethylene oxide, nylon, polyacetal, polysulfone, polybutylene, polyurethane, polyetherimide, polyetherketone, polyphthalamide, polyimide, poly(vinyl acetate), polyacrylonitrile, polyvinylidene fluoride, polylactic acid, carboxymethylcellulose, polytrimethylene terephthalate, or suitable co-polymers of two or more thereof.

In one embodiment, the at least one conductive compound includes, but is not limited to, carbon black, nanoparticles of carbon black, metal particles formed from one or more conductive metals or conductive metal alloys, metal nanoparticles formed from one or more conductive metals or conductive metal alloys, other conductive non-metallic particles or nanoparticles, or any suitable combination of two or more thereof.

In one instance, each of the first and second conductive fiber layers independently contain about 5 to about 15 weight percent of carbon black, or about 7 to about 13 weight percent of carbon black, or even about 7 to about 11 weight percent of carbon black. Additionally, it should be noted that here, as well as elsewhere in the specification and claims, individual range limits can be combined to form additional non-disclosed range limits. In still another embodiment, the at least one polymer compound is selected from one or more polycaprolactones and the at least one conductive compound is selected from carbon black.

In still another embodiment, the present invention relates to a method for determining variations in localized flow rates, pressure gradients, and/or particle loading in a filter medium, the method comprising the steps of: (I) supplying at least one filter medium having located therein at least one strain sensor, the at least one strain sensor comprising: (a) at least one conductive electrospun fiber portion containing therein or thereon at least one conductive compound, wherein the at least one conductive electrospun fiber portion is mounted on a substrate, or freely suspended, via at least two contact points; (b) at least one electric current and/or voltage sensing device that is designed to provide an electric current and/or voltage to the at least one conductive electrospun fiber portion via at least two appropriately spaced contact points; and (c) at least one electric current and/or voltage calculation and/or observation means; (II) supplying at least one electric current and/or voltage sensing device that is designed to monitor the electric current and/or voltage through the at least one conductive electrospun portion of the at least one strain sensor; (III) supplying at least one electric current and/or voltage calculation and/or observation means designed to monitor any change in the electric current and/or voltage through the at least one conductive electrospun portion of the at least one strain sensor; and (IV) using any such change in the electric current and/or voltage through the at least one conductive electrospun portion of the at least one strain sensor to determine one or more variations in localized flow rates, pressure gradients, and/or particle loading in a filter medium.

In one instance, the at least one electric current and/or voltage calculation and/or observation means for the above method includes, but is not limited to, a computer, gauge, or oscilloscope. In one embodiment, the at least one conductive compound includes, but is not limited to, carbon black, nanoparticles of carbon black, metal particles formed from one or more conductive metals or conductive metal alloys, metal nanoparticles formed from one or more conductive metals or conductive metal alloys, other conductive non-metallic particles or nanoparticles, or any suitable combination of two or more thereof.

In one instance, the at least one conductive electrospun fiber portion of this embodiment contains about 5 to about 15 weight percent of carbon black, or about 7 to about 13 weight percent of carbon black, or even about 7 to about 11 weight percent of carbon black. Additionally, it should be noted that here, as well as elsewhere in the specification and claims, individual range limits can be combined to form additional non-disclosed range limits.

In one embodiment, the at least one conductive electrospun fiber portion is formed from a combination of at least one polymer compound and the at least one conductive compound. In one instance, the at least one polymer compound is selected from, but not limited to, one or more polymers or copolymers of polyethylene, polypropylene, polycaprolactone, polystyrene, polyethylene oxide, nylon, polyacetal, polysulfone, polybutylene, polyurethane, polyetherimide, polyetherketone, polyphthalamide, polyimide, poly(vinyl acetate), polyacrylonitrile, polyvinylidene fluoride, polylactic acid, carboxymethylcellulose, polytrimethylene terephthalate, or suitable co-polymers of two or more thereof.

Although the invention has been described in detail with particular reference to certain aspects detailed herein, other aspects can achieve the same results. Variations and modifications of the present invention will be obvious to those skilled in the art, and the present invention is intended to cover in the appended claims all such modifications and equivalents.

What is claimed is:

1. A strain sensor comprising:
   (a) at least one conductive electrospun fiber portion containing therein or thereon at least one conductive compound, wherein the at least one conductive electrospun fiber portion is mounted on a substrate, or freely suspended, via at least two contact points;
   (b) at least one electric current and/or voltage sensing device that is designed to provide an electric current and/or voltage to the at least one conductive electrospun fiber portion via at least two appropriately spaced contact points; and
   (c) at least one electric current and/or voltage calculation and/or observation means,
   wherein the electric current and/or voltage sensing device is designed to monitor the electric current and/or voltage through the at least one conductive electrospun portion, and in conjunction with the at least one electric current and/or voltage calculation and/or observation means permits one to monitor the strain that exists in the at least one conductive electrospun fiber portion of the strain sensor.

2. The strain-sensor of claim 1, wherein the at least one electric current and/or voltage calculation and/or observation means is a computer, gauge, or oscilloscope.

3. The strain-sensor of claim 1, wherein the at least one conductive compound is carbon black.

4. The strain-sensor of claim 1, wherein the at least one conductive electrospun fiber portion contains about 5 to about 15 weight percent of carbon black.

5. The strain-sensor of claim 4, wherein the at least one conductive electrospun fiber portion contains about 7 to about 13 weight percent of carbon black.

6. The strain-sensor of claim 4, wherein the at least one conductive electrospun fiber portion contains about 7 to about 11 weight percent of carbon black.

7. The strain-sensor of claim 1, wherein the at least one conductive electrospun fiber portion is formed from a combination of at least one polymer compound and the at least one conductive compound.

8. The strain-sensor of claim 7, wherein the at least one polymer compound is selected from one or more polymers or copolymers of polyethylene, polypropylene, polycaprolactone, polystyrene, polyethylene oxide, nylon, polyacetal, polysulfone, polybutylene, polyurethane, polyetherimide, polyetherketone, polyphthalamide, polyimide, poly(vinyl acetate), polyacrylonitrile, polyvinylidene fluoride, polylactic acid, carboxymethylcellulose, polytrimethylene terephthalate, or suitable co-polymers of two or more thereof.

9. The strain-sensor of claim 7, wherein the at least one polymer compound is selected from one or more polycaprolactones and the at least one conductive compound is selected from carbon black.

10. A strain-sensor comprising:
   (i) a first conductive fiber layer, the first conductive fiber layer having a top surface and a bottom surface;
   (ii) a filter layer, the filter layer having a top surface and a bottom surface where the top surface of the filter layer is in contact with the bottom surface of the first conductive layer;
   (iii) a second conductive fiber layer, the second conductive fiber layer having a top surface and a bottom surface where the top surface of the second conductive fiber layer is in contact with the bottom surface of the filter layer;
   (iv) at least one electric current and/or voltage sensing device that is designed to provide an electric current and/or voltage to the combination of the first conductive fiber layer, the filter layer, and the second conductive fiber layer via at least two appropriately spaced contact points; and
   (v) at least one electric current and/or voltage calculation and/or observation means,
   wherein the electric current and/or voltage sensing device is designed to monitor the electric current and/or voltage through the combination of the first conductive fiber layer, the filter layer, and the second conductive fiber layer, and in conjunction with the at least one calculation means permits one to monitor the strain that exists in the strain sensor.

11. The strain-sensor of claim 10, wherein at least one electric current and/or voltage calculation and/or observation means is a computer, gauge, or oscilloscope.

12. The strain-sensor of claim 10, wherein the first and second conductive fiber layers are each formed from electrospinning a combination of at least one polymer compound and at least one conductive compound.

13. The strain-sensor of claim 12, wherein the at least one polymer compound is selected from one or more polymers or copolymers of polyethylene, polypropylene, polycaprolactone, polystyrene, polyethylene oxide, nylon, polyacetal, polysulfone, polybutylene, polyurethane, polyetherimide, polyetherketone, polyphthalamide, polyimide, poly(vinyl acetate), polyacrylonitrile, polyvinylidene fluoride, polylactic acid, carboxymethylcellulose, polytrimethylene terephthalate, or suitable co-polymers of two or more thereof.

14. The strain-sensor of claim 12, wherein the at least one conductive compound is carbon black.

15. The strain-sensor of claim 14, wherein each of the first and second conductive fiber layers independently contain from about 5 to about 15 weight percent of carbon black.

16. The strain-sensor of claim 14, wherein each of the first and second conductive fiber layers independently contain from about 7 to about 13 weight percent of carbon black.

17. The strain-sensor of claim 14, wherein each of the first and second conductive fiber layers independently contain from about 7 to about 11 weight percent of carbon black.

18. The strain-sensor of claim 12, wherein the at least one polymer compound is selected from one or more polycaprolactones and the at least one conductive compound is selected from carbon black.

19. A method for determining variations in localized flow rates, pressure gradients, and/or particle loading in a filter medium, the method comprising the steps of:
(I) supplying at least one filter medium having located therein at least one strain sensor, the at least one strain sensor comprising:
 (a) at least one conductive electrospun fiber portion containing therein or thereon at least one conductive compound, wherein the at least one conductive electrospun fiber portion is mounted on a substrate, or freely suspended, via at least two contact points;
 (b) at least one electric current and/or voltage sensing device that is designed to provide an electric current and/or voltage to the at least one conductive electrospun fiber portion via at least two appropriately spaced contact points; and
 (c) at least one electric current and/or voltage calculation and/or observation means;
(II) supplying at least one electric current and/or voltage sensing device that is designed to monitor the electric current and/or voltage through the at least one conductive electrospun portion of the at least one strain sensor;
(III) supplying at least one electric current and/or voltage calculation and/or observation means designed to monitor any change in the electric current and/or voltage through the at least one conductive electrospun portion of the at least one strain sensor; and
(IV) using any such change in the electric current and/or voltage through the at least one conductive electrospun portion of the at least one strain sensor to determine one or more variations in localized flow rates, pressure gradients, and/or particle loading in a filter medium.

20. The method of claim 19, wherein at least one electric current and/or voltage calculation and/or observation means is a computer, gauge, or oscilloscope.

21. The method of claim 19, wherein the at least one conductive compound is carbon black.

22. The method of claim 21, wherein the at least one conductive electrospun fiber portion contains about 5 to about 15 weight percent of carbon black.

23. The method of claim 21, wherein the at least one conductive electrospun fiber portion contains about 7 to about 13 weight percent of carbon black.

24. The method of claim 21, wherein the at least one conductive electrospun fiber portion contains about 7 to about 11 weight percent of carbon black.

25. The method of claim 19, wherein the at least one conductive electrospun fiber portion is formed from a combination of at least one polymer compound and the at least one conductive compound.

26. The method of claim 25, wherein the at least one polymer compound is selected from one or more polymers or copolymers of polyethylene, polypropylene, polycaprolactone, polystyrene, or suitable co-polymers of two or more thereof.

27. The method of claim 25, wherein the at least one polymer compound is selected from one or more polycaprolactones and the at least one conductive compound is selected from carbon black.

* * * * *